(12) United States Patent
Colley

(10) Patent No.: US 7,204,422 B2
(45) Date of Patent: *Apr. 17, 2007

(54) SYSTEM, CIRCUIT, AND METHOD FOR EDGE DETECTION IN A BINARY OPTICAL CODE

(75) Inventor: James E. Colley, Junction City, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/039,193

(22) Filed: Jan. 18, 2005

(65) Prior Publication Data

US 2005/0274809 A1 Dec. 15, 2005

Related U.S. Application Data

(63) Continuation-in-part of application No. 10/866,308, filed on Jun. 10, 2004.

(51) Int. Cl.
*G02B 26/10* (2006.01)
*G02B 5/00* (2006.01)
*G06K 7/10* (2006.01)
*G06K 9/22* (2006.01)
*G06K 19/06* (2006.01)

(52) U.S. Cl. ............... 235/462.25; 235/462.16; 235/462.32

(58) Field of Classification Search ............ 235/462.16, 235/462.01, 462.09, 462.25, 462.27, 462.24, 235/462.28, 462.29, 462.31, 462.32, 461, 235/454; 382/193, 196–199

See application file for complete search history.

(56) References Cited

U.S. PATENT DOCUMENTS

| | | | |
|---|---|---|---|
| 4,000,397 A | 12/1976 | Hebert et al. | 235/61.11 |
| 5,302,813 A | 4/1994 | Goren | 235/462 |
| 5,449,893 A | 9/1995 | Bridgelall et al. | 235/462 |
| 5,514,858 A * | 5/1996 | Ackley | 235/462.16 |
| 5,633,488 A * | 5/1997 | Spitz | 235/462.27 |
| 5,734,152 A | 3/1998 | Goren et al. | 235/462 |
| 6,012,639 A | 1/2000 | Colley et al. | 235/462.16 |
| 6,012,640 A * | 1/2000 | Liu | 235/462.26 |
| 6,209,788 B1 * | 4/2001 | Bridgelall et al. | 235/462.32 |
| 6,499,662 B1 * | 12/2002 | Coleman et al. | 235/462.18 |
| 6,951,304 B2 * | 10/2005 | Good | 235/462.32 |
| 6,978,937 B2 * | 12/2005 | Iwaguchi et al. | 235/462.16 |

* cited by examiner

*Primary Examiner*—Michael G. Lee
*Assistant Examiner*—Thien T. Mai
(74) *Attorney, Agent, or Firm*—Stoel Rives LLP

(57) ABSTRACT

Systems process an input signal, derived from a binary optical code, having a series of multiple successive local peaks of the same given polarity. The circuit comprises a peak detector, a node in the peak detector, and a set-reset flip-flop. The peak detector has an input receiving the input signal and produces an output that approximately tracks the input signal while it is sloping in the direction of the given polarity and that approximately holds near those local peaks having successively larger magnitude. A node in the peak detector has a voltage indicative of whether the peak detector is in a tracking or holding state. The set-reset flip-flop has a set input connected to the node, whereby the output of the flip-flop is high when the peak detector is in a tracking state. The circuit is useful for qualifying optical edges in a bar code.

20 Claims, 8 Drawing Sheets

SYSTEM, CIRCUIT, AND METHOD FOR EDGE DETECTION IN A BINARY OPTICAL CODE

RELATED APPLICATION

This application is a continuation-in-part of application Ser. No. 10/866,308, entitled "System, Circuit, and Method for Edge Detection in a Binary Optical Code," filed Jun. 10, 2004, which is incorporated by reference in its entirety herein.

TECHNICAL FIELD

The field of this disclosure relates generally to optical code readers, such as, for example, bar code readers, and more particularly to signal processing techniques and circuitry for determining edge positions in a binary optical code.

BACKGROUND

Today bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., oranges) or a unique item (e.g., U.S. Pat. No. 6,012,639). FIG. 1A depicts a segment of a typical bar code 100, with alternating bars (i.e., dark areas) 102 and spaces (i.e., light areas) 104. The positions of the bars 102 and spaces 104 encode particular information. More specifically, the widths of the bars 102 and spaces 104 are often set to encode a desired information sequence, as the pattern of bars and spaces represents a string of binary ones and zeros, wherein the width of any particular bar or space is an integer multiple of a specified minimum width, which is called a "module" or "unit." Thus, to decode the information, a bar code reader must be able to reliably discern the edge locations of the bars 102 and the spaces 104. The leading edge of a bar (i.e., a light-to-dark transition) is commonly denoted as an STV (set video), and the trailing edge of a bar (i.e., a dark-to-light transition) is commonly denoted as an RTV (reset video). The first several STVs and RTVs of the bar code 100 are labeled in FIG. 1A, assuming (arbitrarily) that the bar code is scanned from left to right.

Optical scanning equipment can be utilized to generate an electrical signal indicative of the positions of bars and spaces in a bar code. Such a signal, denoted x(t), is depicted in simplified form in FIG. 1B for the corresponding bar code 100. Before describing the processing of the signal x(t), a brief description of the optical scanning equipment that generates that signal is helpful. A more complete introduction to the optical scanning of bar codes can be found in the background section of the above-noted U.S. Pat. No. 6,102,639, the entirety of which is incorporated by reference herein. Typical optical scanning equipment comprises one or more illumination sources and one or more photo detectors. The illumination source may be a laser producing a focused beam spot on a small area of the bar code 100. As the laser spot and the bar code 100 move relative to each other, such that the spot is scanned across the bar code 100, a photo detector detects the laser light reflected off the bar code 100 and produces an electrical signal whose magnitude is related to the optical power of the reflected signal. Thus, as the spot scans across the bar code 100, the photo detector generates an electrical signal whose variations over time at least roughly correlate to the spatial pattern of bars 102 and spaces 104 in the bar code 100. Alternatively, the illumination source may be diffuse across the entire bar code 100, and the bar code may be imaged using a charge-coupled device (CCD) camera or a CMOS (complementary metal-oxide-semiconductor) imager, either of which forms an electronic image of the bar code 100. That electronic image can be sampled in the forward direction of the bar code 100 to generate a virtual scan line signal, much like the scan line signal generated with a scanning laser spot. In any event, the result is an electronic signal, which, at least ideally, somehow relates to the spatial positions of the bars 102 and spaces 104 in the bar code 100. The next step is to process that signal to determine with some reliability where the edges (STVs and RTVs) lie.

FIG. 2 is schematic diagram of a conventional edge detection system 200 for processing the scan line signal x(t) illustrated in FIG. 1B. The system 200 performs edge detection using a typical gated peak detection scheme. In general functional terms, the system 200 operates by forming the first and second derivatives of the scan line signal x(t) and by detecting zero crossings of the second derivative, which ideally represent optical edges. Moreover, the system 200 qualifies zero crossings of the second derivative only if the first derivative exceeds a threshold. In terms of hardware, the system 200 includes a double differentiator 220, an envelope detector 230, three comparators 240, 242, and 246, and two logical AND gates 250 and 255. The hardware operates as follows: As a preliminary matter, a preamplifier (not shown) may amplify, buffer, invert and/or condition the scan line signal x(t), which is received at the input of the differentiator 220. The differentiator 220 produces a first derivative signal x'(t) and second derivative signal x"(t), respectively. While it is also possible to generate the first and second derivative signals x'(t) and x"(t) using two separate single differentiators, it is preferable to use common hardware to produce both to ensure more easily that x'(t) are x"(t) are time-aligned, as described in U.S. Pat. No. 6,073,849, which is incorporated herein by reference. The envelope detector 230 processes the first derivative signal x'(t) to determine, based on the extreme maximum and minimum values of that signal, a threshold value T somewhat smaller in magnitude than those extreme values. One example of a suitable implementation of the envelope detector 230 is disclosed in U.S. Pat. No. 4,000,397, which is incorporated herein by reference. By comparing the first derivative signal x'(t) to that threshold value, the comparators 240 and 242 detect peaks in that signal and produce respective logical true-valued outputs $y_S(t)$ and $y_R(t)$ when the first derivative signal x'(t) exceeds the threshold value. Because sharp transitions in the value of the scan signal x(t) should produce peaks in the first derivative signal x'(t), either $y_S(t)$ and $y_R(t)$ should be a logical true value during such peaks ($y_S(t)$ being true during a minimum or negative peak, and $y_R(t)$ being true during a maximum or positive peak). Because the second derivative signal should cross zero at such peaks, the comparator 246 is configured to detect those zero crossings and enable the appropriate AND gate 250 or 255, respectively, to generate the STV or RTV signal, such that only one of which is true at any given time.

Further insight into the operation of the system 200 can be gleaned by returning to FIG. 1, in which FIGS. 1B–1H are voltage-versus-time plots for various signals in the system 200. FIG. 1B, as already noted, is a plot of the scan line signal x(t), which is derived from a photo detector current, which is generally at a higher value during the spaces 104 and a lower value during the bars 102, as more light is reflected from the spaces 104 than the bars 102. (Depending upon the optical scanning equipment, that relationship may be reversed.) However, the scan line signal x(t) is not a perfect representation of the bar code 100 for a variety of reasons discussed below. FIG. 1C is a plot of the first derivative signal x'(t), including the threshold levels +T and −T. FIG. 1D is the second derivative signal x"(t), which, as one can see, crosses zero whenever the first derivative signal x'(t) is at a peak. FIG. 1E shows the signal $y_S(t)$, the output of the comparator 240. As can be seen, assuming high-true logic levels, as utilized in this figure, $y_S(t)$ is high when x'(t)<−T. Similarly, FIG. 1F shows the signal $y_R(t)$, the output of the comparator 242, which is high when x'(t)>+T. Finally, FIGS. 1G and 1H are plots of the RTV and STV signals, respectively, which are the logical AND combination of $y_R(t)$ and the condition that x"(t)<0, and $y_S(t)$ and the condition that x"(t)>0.

As the inventors have recognized, a shortcoming of the system 200 is that the STV and RTV signals may contain multiple pulses for a single transition in the bar code 100 and thus do not unambiguously indicate edge positions in the bar code 100. This is due to the fact that more than one peak can occur in the first derivative signal x'(t) for a single real edge in the bar code 100—a phenomenon that can be called "peak multiplication." There are several reasons why more than one peak may appear in x'(t) for a given real transition edge. Some reasons are attributable to the optical scanner. For example, the spot profile of the laser beam may have multiple peaks. Another reason may be noise introduced by the optical scanner or the electronic circuitry. Other reasons are traceable to external factors, including poor bar code printing quality, poor substrate quality or roughness, inconsistent bar or space color, modulated lighting effects, etc. Regardless of the cause, each local first derivative peak is detected as a separate like edge by the system 200. However, multiple adjacent edges of the same type (STV or RTV) cannot be legitimate, as adjacent edges must be of alternating types. Only one edge in such a group is the best estimate of the true edge position.

Other edge detection techniques suffer from the same problem. For example, multi-bit digitizers, such as the systems disclosed in U.S. Pat. Nos. 5,302,813, 5,449,893, and 5,734,152, which operate by digitizing the first derivative peaks for an entire scan line and then applying various thresholds to the entire digitized record until a decodable peak pattern results, perform poorly in the presence of ISI (inter-symbol interference), which can result, for example, from the laser spot size being large compared to the unit width, and do not inherently ensure that multiple adjacent edges are rejected.

Bar codes are just one example of the many types of optical codes in use today. In general, optical codes encode useful, optically-readable information about the items to which they are attached or otherwise associated. While bar codes generally encode information across one dimension, higher-dimensional optical codes are also possible, such as, two-dimensional matrix codes (e.g., MaxiCode) or stacked codes (e.g., PDF 417). Decoding binary optical codes in general poses the same challenges, such as peak multiplication, posed by bar codes in particular.

SUMMARY

The present invention is directed to methods, systems, and circuits for detecting transitions in a binary optical code signal, and thus detecting edges in a binary optical code.

According to one embodiment, a system processes a signal imperfectly indicating perceived regions of relatively light and dark areas arranged in an alternating pattern as part of a binary optical code. The system comprises a differentiator, a first comparator, a second comparator, and a circuit. The differentiator generates a first derivative of the signal. The first comparator, which is connected to the differentiator, compares the first derivative to a first threshold and produces an output when the first derivative exceeds the first threshold. The second comparator, which is also connected to the differentiator, compares the first derivative to a second threshold and produces an output when the first derivative is less than the second threshold. The circuit receives as an input the first derivative. The first derivative has a magnitude measured with respect to a reference level. The first derivative undergoes half-cycles of alternating polarity between successive crossings of the reference level. The first derivative has within a half-cycle a series of one or more successive local peaks of the same polarity as the half-cycle in which they occur. The circuit comprises a first peak detector, a node in the first peak detector, and a first set-reset flip-flop. The first peak detector has an input receiving the first derivative. The first peak detector is operative during a positive half-cycle either to produce an output that approximately tracks the first derivative while both (a) the first derivative is sloping in the positive direction and (b) the first derivative is greater than at any previous time during the positive half-cycle or to produce an output that approximately holds near local positive peaks having increasingly larger magnitude in the positive half-cycle. The first node in the first peak detector has a voltage indicative of whether the first peak detector is in a tracking state or a holding state. The first node is connected to a set input of the first set-reset flip-flop. The circuit also comprises a second peak detector, a node in the second peak detector, and a second set-reset flip-flop. The second peak detector is operative during a negative half-cycle either to produce an output that approximately tracks the first derivative while both (a) the first derivative is sloping in the negative direction and (b) the first derivative is less than at any previous time during the negative half-cycle or to produce an output that approximately holds near local negative peaks having decreasingly lower value in the negative half cycle. The second node the second peak detector has a voltage indicative of whether the second peak detector is in a tracking state or a holding state. The second node is connected to a set input of the second set-reset flip-flop.

According to another embodiment, a circuit detects edges in a binary optical code. The circuit comprises a means for receiving a signal imperfectly indicating perceived regions of relatively dark and relatively light areas arranged in an alternating pattern as part of a binary optical code; a means for differentiating the signal to form a first derivative of the signal, wherein the first derivative may have a series of successive local peaks of the same polarity; a means for ignoring peaks in the series having a peak value less than any previous peak value in the series, thereby resulting in a set of unignored peaks; a means for choosing from the unignored peaks in the series the one peak occurring last in order; and a means for generating, according to the chosen peak, a signal indicative of an edge between a light area and a dark area in the pattern.

According to yet another embodiment, a method chooses a single peak among a series of multiple like-polarity successive local peaks in a first derivative of a scan line signal derived by reading a binary optical code. The method tracks the first derivative while it is not less than a previous one of the multiple like-polarity successive local peaks in the first derivative. The method holds a value approximately equal to a peak that is greater than any previous one of the multiple like-polarity successive local peaks in the first derivative, until a larger magnitude peak in the series of multiple like-polarity successive local peaks is encountered. Based on the occurrence of the tracking and holding steps, the method disregards those peaks in the series having a peak value less than any previous peak in the series.

According to another embodiment, a circuit processes an input signal derived from a binary optical code. The magnitude of the input signal is measured with respect to a reference level. The input signal undergoes a half-cycle between successive crossings of the reference level. During the half-cycle, the input signal has a series of multiple successive local peaks of the same polarity as the half-cycle in which they occur. The circuit comprises a peak detector, a node in the peak detector, and a set-reset flip-flop. The peak detector has an input receiving the input signal and approximately tracks the input signal while the absolute value of the input signal is both (a) increasing and (b) greater than at any previous time during the half-cycle. The peak detector otherwise approximately holds near those local peaks having increasingly larger magnitudes in the series of multiple successive peaks of the same polarity as the half-cycle. A node in the peak detector has a voltage indicative of whether the peak detector is in a tracking state or a holding state. The set-reset flip-flop has a set input connected to the node, whereby the output of the flip-flop is set when the peak detector is in a tracking state.

Details concerning the construction and operation of particular embodiments are set forth in the following sections.

DETAILED DESCRIPTION OF EMBODIMENTS

With reference to the above-listed drawings, this section describes particular embodiments and their detailed construction and operation. Certain embodiments are capable of achieving certain advantages over the known prior art, including some or all of the following: (1) more reliable detection of the most likely peak among multiple peaks resulting from peak multiplication; (2) improved edge detection performance under challenging detection conditions in the presence of noise, inter-symbol interference (ISI), poor laser spot quality, poor bar code print quality, and/or small bar code feature size; (3) improved performance at a small price in terms of circuitry space, weight, and power; (4) large input signal bandwidth range; and (5) consistent performance regardless of the time rate of change of the input signal, the impulse response width of the scanner, and the bandwidth of the signal processor. These and other advantages of various embodiments will be apparent upon reading the following.

Figure 1A:
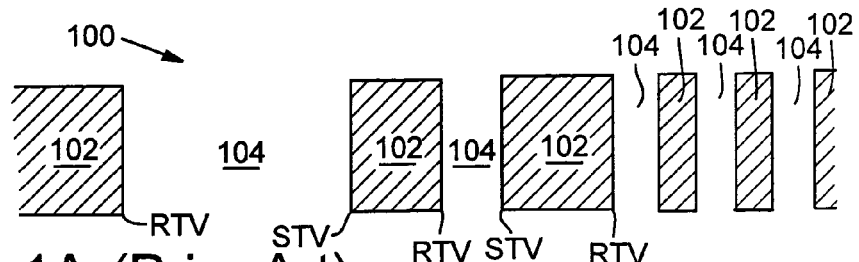
FIGS. 1A–1H depict a segment of a bar code and a set of voltage-versus-time plots for various signals in the circuit of FIG. 2.
Figure 1B:
Figure 1C:
Figure 1D:
Figure 1E:
Figure 1F:
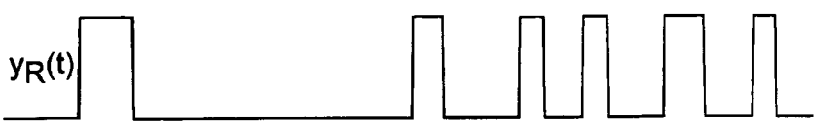
Figure 1G:
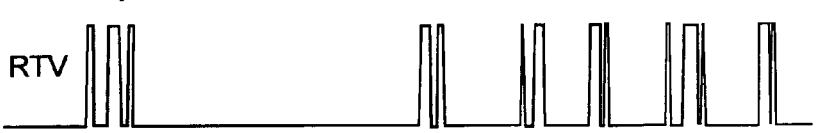
Figure 1H:
Figure 2:
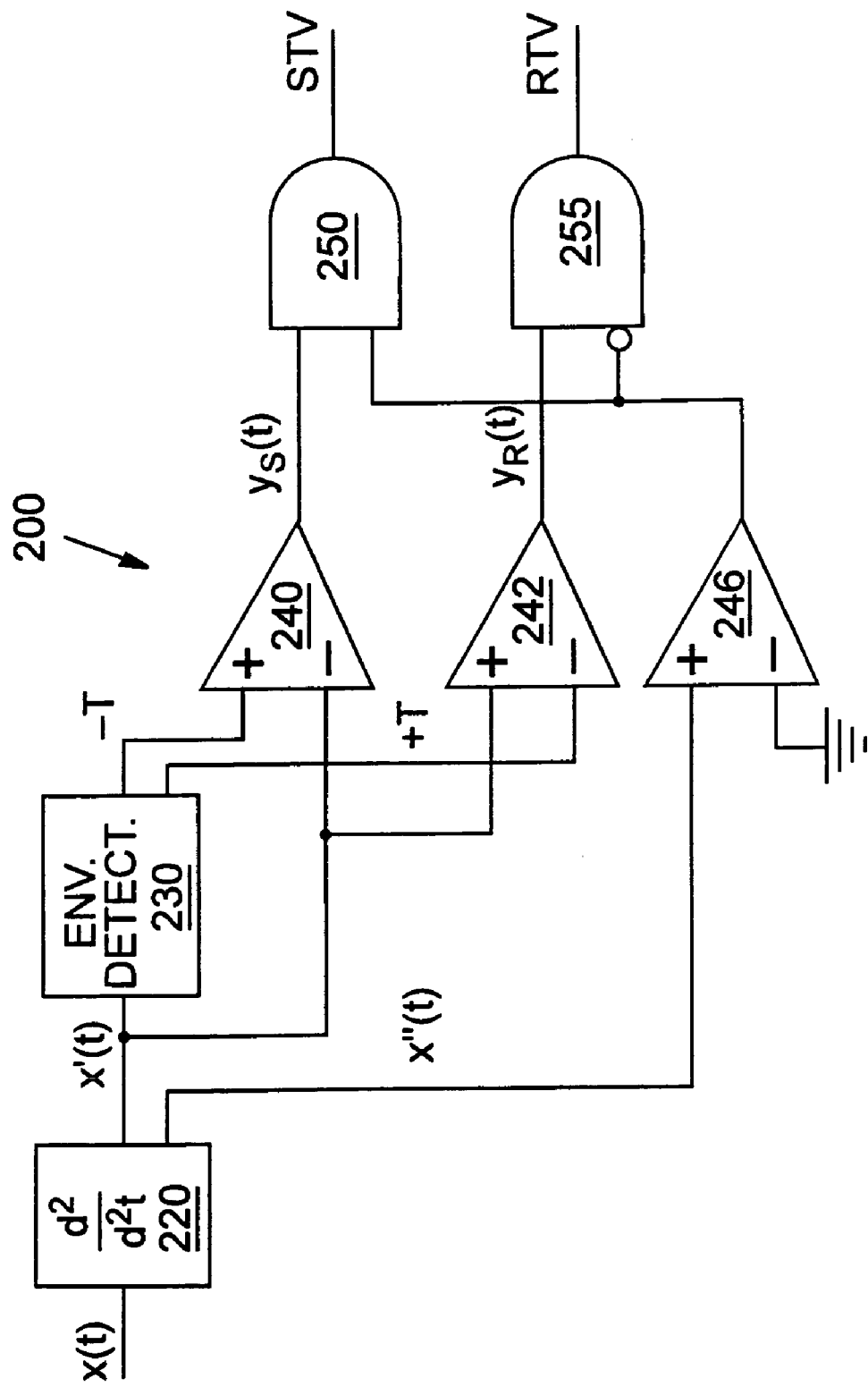
FIG. 2 is a block diagram of a conventional system for detecting edges in the bar code of FIG. 1A.
Figure 3:
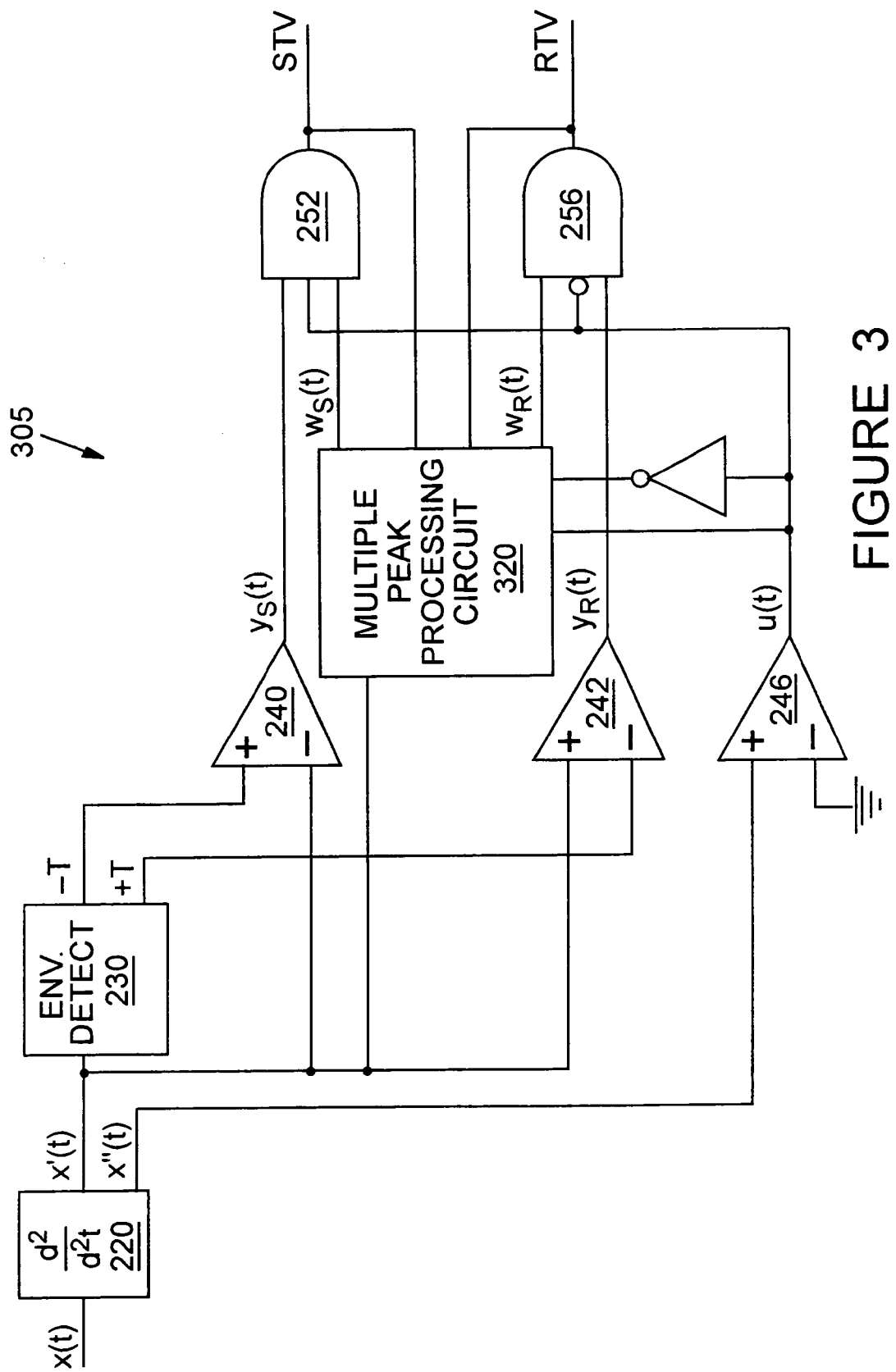
FIG. 3 is a block diagram of an edge detection system according to one embodiment.

FIG. 3 is a block diagram of an edge detection system 305, according to one embodiment. The system 305, like the conventional system 200, operates according to a gated peak detection scheme, whereby zero crossings of the second derivative signal x"(t) are detected and qualified based on the amplitude of the first derivative signal x'(t). Thus, the differentiator 220; envelope detector 230; and comparators 240, 242, and 246 can be the same hardware components as in the conventional system 200. Moreover, the gated peak signals $y_S(t)$ and $y_R(t)$ represent in digital form the locations of local maxima and minima, respectively, in the first derivative signal x'(t), just as in the conventional system 200. The output of the comparator 246 is labeled u(t) in FIG. 3. The second derivative polarity signal u(t) is high when x"(t) is positive (i.e., when x'(t) is increasing) or low when x"(t) is negative (i.e., when x'(t) is decreasing). As in the conventional system, second derivative zero crossings, indicated by transitions in u(t), indicate possible edge positions on the target label. The system 305 differs from the conventional system 200, however, in the way in which the zero crossings of the second derivative signal x"(t) are qualified to determine the most likely edge position. More specifically, the system 305, unlike the conventional system 200, includes a multiple peak processing circuit 320, which rejects spurious peaks in the first derivative signal x'(t), as described in greater detail below. The outputs of the multiple peak processing circuit 320 are peak qualifying signals $w_S(t)$ and $w_R(t)$, which the system 305 utilizes in conjunction with the signals $y_S(t)$ and $y_R(t)$ to qualify zero crossings of the second derivative signal x"(t).

Figure 4:
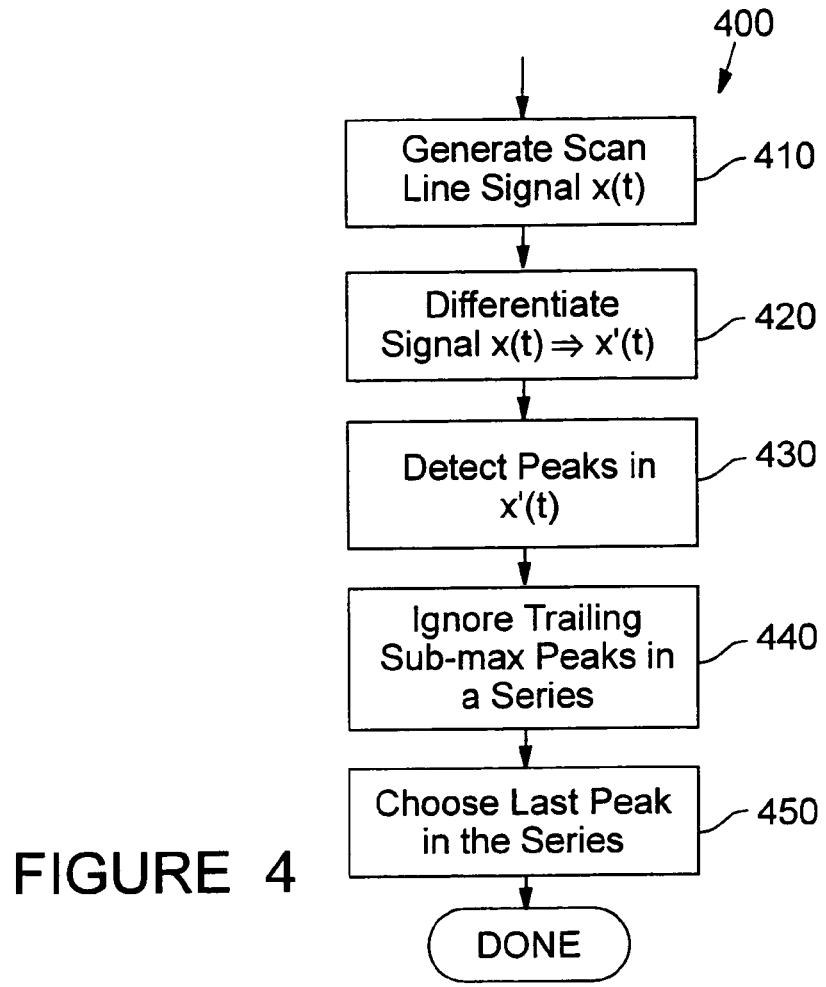
FIG. 4 is a flowchart of a method according to one embodiment.

The functional operation of the multiple peak processing circuit 320 can be understood by examining FIG. 4, which is a flowchart of a method 400 performed by, for example, the system 305. The method 400 begins by generating (step 410) a scan line signal x(t) and differentiating (step 420) that signal. Next, the method 400 detects (step 430) peaks in the first derivative signal x'(t). The output of the detecting step 430 is, in general, for each actual bar code edge, a series of successive like-polarity peaks, such as represented by the gated peak signals $y_S(t)$ and $y_R(t)$. One such series of peaks is labeled $p_1, p_2, \ldots, p_6$ and another is formed by the peaks labeled $p_7, p_8, \ldots, p_{10}$ in FIG. 5, which is a plot of the first derivative signal x'(t) in the vicinities of two edge transitions in a bar code. As shown, peak $p_4$ is the maximum peak in the first group and therefore the most likely one representing the true edge location. However, a number of spurious leading peaks ($p_1$, $p_2$, and $p_3$) and trailing peaks ($p_5$ and $p_6$) are also present in the first group. The method 400 ignores or discards the spurious peaks and chooses the maximum peak $p_4$ in two steps. The first step is ignoring (step 440) any trailing peaks less than the maximum peak so far encountered. The second step is choosing (step 450) the last remaining peak in the series.

Figure 5:
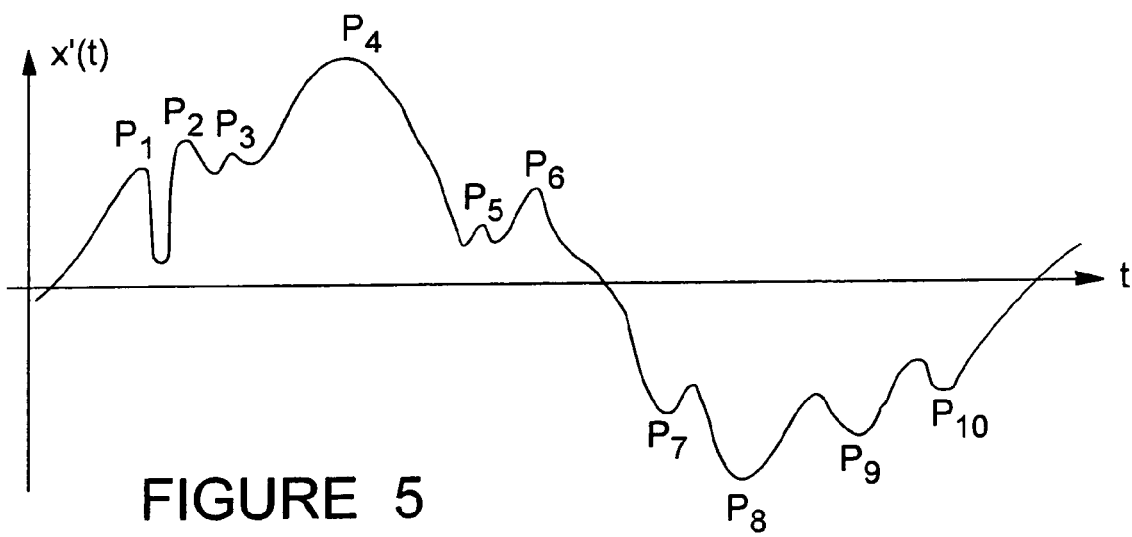
FIG. 5 is a plot of a first derivative signal having a series of local positive peaks and then a series of local negative peaks, illustrating the operation of the method of FIG. 4.

More particularly, with reference to FIG. 5 as an example, the ignoring step 440 first observes peak $p_1$, which it does not discard. So far, peak $p_1$ is the maximum peak encountered. Next, the ignoring step 440 observes peak $p_2$ and does not discard it because, although it trails peak $p_1$, it is not less than $p_1$. Peak $p_2$ now becomes the maximum peak encountered. Next, the ignoring step 440 observes peak $p_3$, which it discards as being less than the maximum at this point (which remains $p_2$). Next, the ignoring step 440 observes peak $p_4$, which it does not discard and which becomes the new maximum peak. Next, the ignoring step 440 observes peaks $p_5$ and $p_6$, which it discards as being less than peak $p_4$. The result of the ignoring step 440 is that peaks $p_3$, $p_5$, and $p_6$ are discarded, while only peaks $p_1$, $p_2$, and $p_4$ are passed to the choosing step 450. The choosing step 450 then chooses peak $p_4$ as the last-in-time peak in the group of non-discarded peaks. The method 400 thus arrives at the peak in the series having the greatest amplitude, which most likely represents the true edge position.

The multiple peak processing circuit 320 performs either the ignoring step 440 or both the ignoring step 440 and the choosing step 450. The choosing step 450 may be performed either before or after the AND gates 252 and 256. A microcontroller implementation of the choosing step 450 is described fully in the above-referenced U.S. Pat. No. 6,012,639 (see, in particular, the microcontroller 430). Other implementations are possible to achieve the same functionality.

Figure 6:
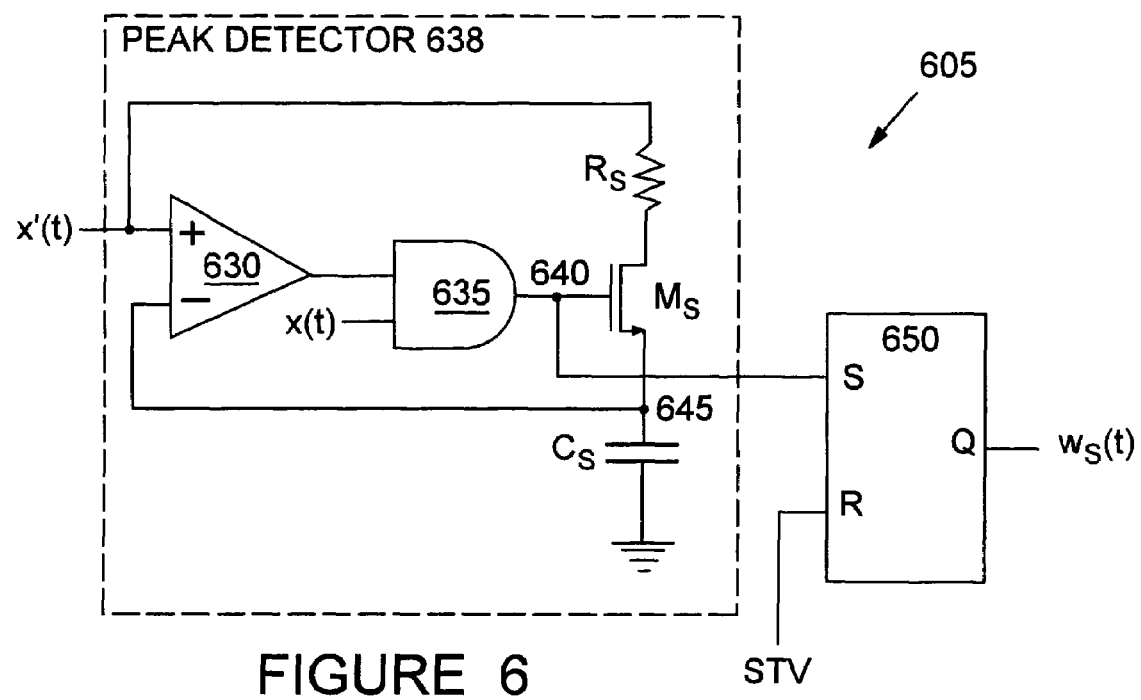
FIG. 6 is a schematic diagram of a circuit performing the ignoring step of the method of FIG. 4.

The ignoring step 440 may be implemented in electronic hardware as set forth, for example, in FIG. 6, which is a schematic diagram of a circuit 605 representing one implementation of one half of the multiple peak processing circuit 320 in the edge detection system 305. For ease of comprehension, the circuit 605 is presented as the circuitry for processing just the positive peaks. The circuit 605 can easily be modified to also operate with an input signal of the opposite polarity; alternatively, a circuit similar to the circuit 605 can easily be constructed to process just the negative peaks.

The circuit 605 comprises a comparator 630, an optional AND gate 635, a resistor $R_S$, a transistor $M_S$, and a capacitor $C_S$, which together form a peak detector 638. The peak detector 638 detects peaks in the first derivative signal x'(t) as follows: Ignoring for the moment the AND gate 635 (or assuming for the moment that u(t) is high, meaning that x'(t) is rising), then the node 640, which is connected to the gate of the transistor $M_S$, is high and therefore turns on the transistor $M_S$ whenever the first derivative signal x'(t) exceeds the voltage across the capacitor $C_S$ at the node 645. In that case, the first derivative signal x'(t) is connected to the node 645 across the resistor $R_S$, causing the voltage at the node 645 to track the first derivative signal x'(t). When the first derivative signal x'(t) begins to decrease, the accumulated charge on the capacitor $C_S$ causes the voltage at the node 645 to be greater than the first derivative signal x'(t), causing the comparator 630 output to go low, which causes the voltage at the node 640 to go low, which in turn causes the transistor $M_S$ to turn off. In that case, the capacitor $C_S$ holds its accumulated charge and the voltage of the node 645 remains essentially constant unless and until the first derivative signal x'(t) exceeds the voltage at the node 645. In other words, the peak detector 638 tracks the first derivative signal x'(t) while it is increasing beyond a previous peak, or holds at a peak value until that peak value is again exceeded. Thus, for example, with reference to FIG. 5, the peak detector 638 would track to and thereafter hold at the maximum peak $p_4$, as shown in simplistic form in FIG. 7A.

While the transistor $M_S$ is illustrated as a field-effect transistor (FET), it may be of any type of switching transistor or other suitable switch. The transistor $M_S$ functions as a switch, where the gate terminal is a control terminal controlling whether there is conduction between controllable conduction terminals, viz., the drain and source terminals.

The peak detector 638 differs from a conventional peak detector, which typically would connect the drain terminal of the transistor $M_S$ to a positive supply voltage. An advantage of the peak detector in the circuit 605 is that it exhibits significantly less overshoot than the conventional implementation. That advantage can be important when processing high bandwidth signals, as often occurs in bar code reading. Overshoot occurs when the comparator 630 has a non-zero propagation delay that delays turn off of the transistor $M_S$. If, as in the conventional peak detector, the drain terminal of the transistor $M_S$ were connected to a positive supply voltage, then significant additional charge could accumulate on the capacitor $C_S$ during that slight delay time. Because the drain terminal of the transistor $M_S$ is connected to the input signal, rather than a supply voltage, there is no additional charging of the capacitor $C_S$ during the comparator's turn-off delay. Instead, there may be some undershoot resulting from discharging of the capacitor $C_S$ as the input signal begins to decrease during the comparator's turn-off delay. Fortunately, that undershoot is considerably smaller in magnitude than the overshoot that the conventional implementation exhibits, as the input signal typically has a fairly flat slope near the time of turn-off.

The parameters of the capacitor $C_S$, the resistor $R_S$, and the transistor $M_S$ are preferably chosen to satisfy application-specific constraints, such as input signal bandwidth, available circuitry area, and tolerable charge injection. For example, the time constant resulting from the product of $C_S$ and $R_S$ should be sufficiently small to permit the circuit to respond to variations in the input signal. Furthermore, charge injection becomes more problematic as the size of the capacitor $C_S$ decreases, and as the size of transistor $M_S$ increases. If the capacitance gets too large, it can affect the stability of the amplifier providing the input signal; resistor $R_S$ should therefore be large enough to isolate the amplifier output from this capacitance while in the tracking mode. Those and other considerations can be taken into account in determining suitable parameter values characterizing the capacitor $C_S$, the resistor $R_S$, and the transistor $M_S$.

The AND gate 635 is an optional component in the circuit 605. If included, as shown in FIG. 6, it can hasten the turn-off of the transistor $M_S$, as the second derivative polarity signal u(t) tends to become negative earlier than the comparator 630 recognizes that a peak has been reached. One reason that the comparator 630 has a non-zero response time during transitions of its inputs is that the comparator 630 has a finite gain and has limited overdrive when its inputs are nearly equal, as is the case during transitions from tracking to holding modes at or near the peaks of the input signal.

Not shown in FIG. 6 is reset circuitry to short the capacitor $C_S$ at the conclusion of a half-cycle. Such reset circuitry is illustrated in FIG. 8, which is discussed below.

Figure 7A:
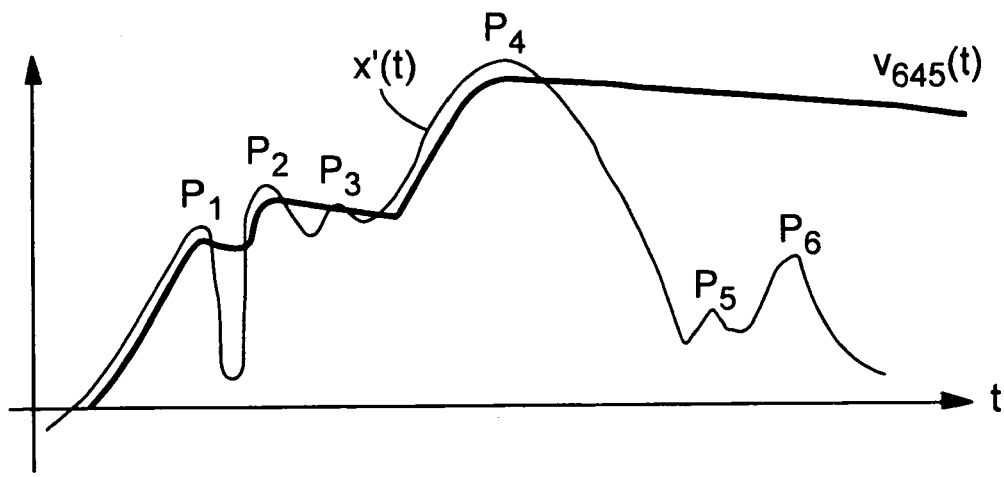
FIGS. 7A and 7B are voltage-versus-time plots for various signals in the circuit of FIG. 6.
Figure 7B:
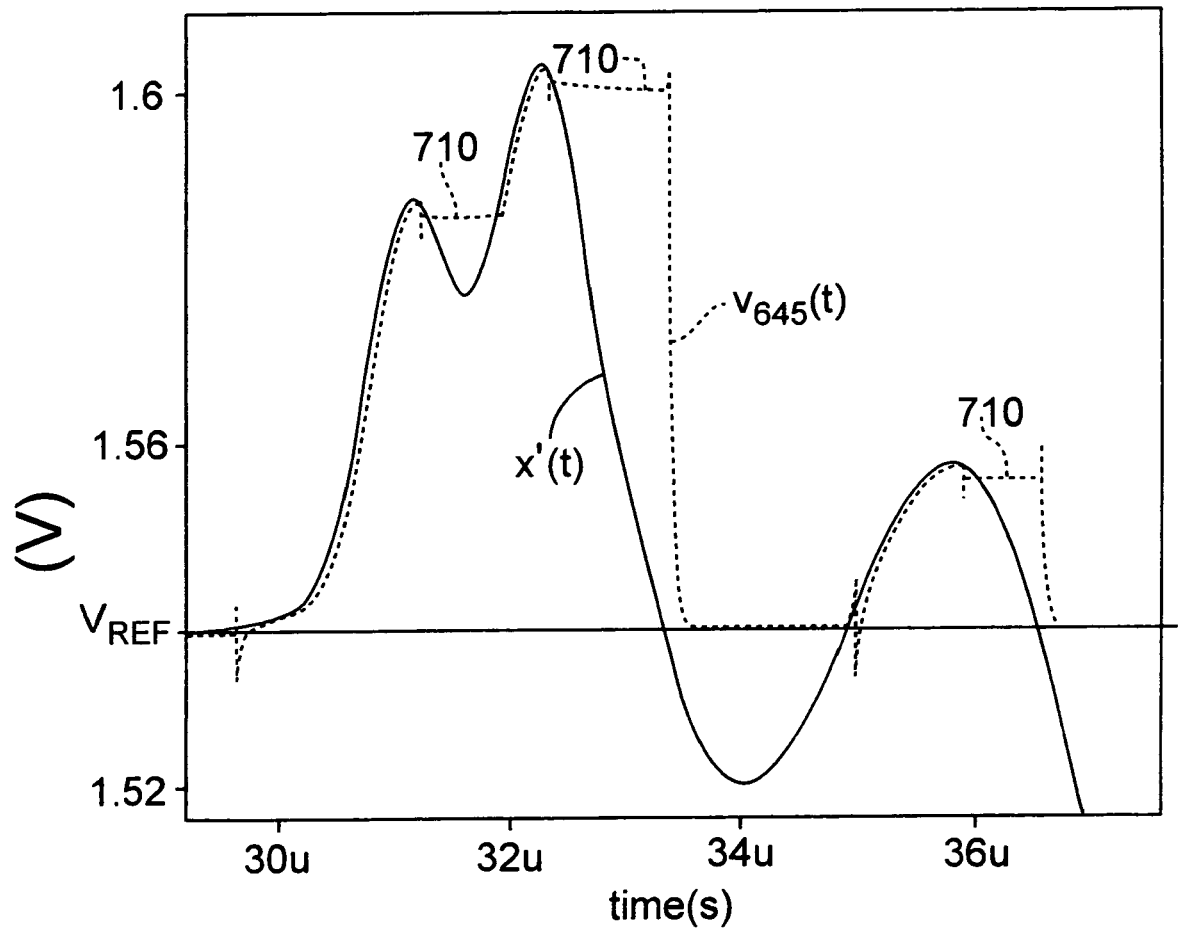

FIG. 7B illustrates a more realistic plot of the behavior of the peak detector portion of the circuit 605 than the simplified one in FIG. 7A. The FIG. 7B plot was generated by computer simulation of the circuit 605 for a case in which the signal strength is quite small (in fact, near the lower limit to acceptably read bar codes). As can be seen, the voltage at the node 645 is generally slightly less than the first derivative signal x'(t). That tracking error becomes less significant as the signal strength increases and in fact is negligible at typical signal strength. FIG. 7B also illustrates some pedestal error in the voltage at the node 645. That appears as "shelves" 710 in the $v_{645}(t)$ waveform after each positive peak in the first derivative signal x'(t), where $v_{645}(t)$ in hold mode is slightly less than the voltage of the preceding peak. The pedestal error is due, in part, to overshoot attributable to finite response time by the comparator 630. The pedestal error is also due, in part, to charge injection in the transistor $M_S$.

Besides the peak detector explained above, the circuit 605 also comprises a set-reset flip-flop 650. The node 640 is connected to the set input of the flip-flop 650, while the STV signal is connected to the reset input of the flip-flop 650. The operation of the flip-flop 650 can be understood by considering the signals depicted in FIG. 7B. As the first derivative signal x'(t) is increasing, the peak detector 638 is in its tracking mode and the voltage at node 640 is high. This state is shown initially in FIG. 7B from about 30 μs to about 31 μs. During this time, the high value at the node 640 sets the flip-flop 650, causing the signal $w_S(t)$ output from the flip-flop 650 to be high. After a slight propagation delay following the first positive peak shown in FIG. 7B, the signals $w_S(t)$, $y_S(t)$ and u(t) are all high, causing the STV signal to be asserted. The STV signal then resets the flip-flop 650. As x'(t) begins to decrease after the first peak, the peak detector enters its holding mode, and the voltage at the node 640 is low, in which case the flip-flop 650 remains reset and $w_S(t)$ remains low. That condition continues until x'(t) increases again and surpasses its previous peak (occurring somewhat after about 32 μs in FIG. 7B), at which point the peak detector 638 switches to its tracking mode, causing the flip-flop 650 to set. At the next peak of x'(t) the STV signal is again asserted briefly until the flip-flop 650 is reset. This process repeats every time x'(t) rises to a peak of greater magnitude than any previous peak during a half-cycle. As a result, in the example depicted in FIG. 7B, for instance, the STV signal is asserted near the peaks $p_1$, $p_2$, and $p_4$, but not the peaks $p_3$, $p_5$, and $p_6$. Among the qualified peaks $p_1$, $p_2$, and $p_4$, subsequent processing detects the last one $p_4$, which is the maximum and best choice among the multiple peaks in the half cycle.

Figure 8:
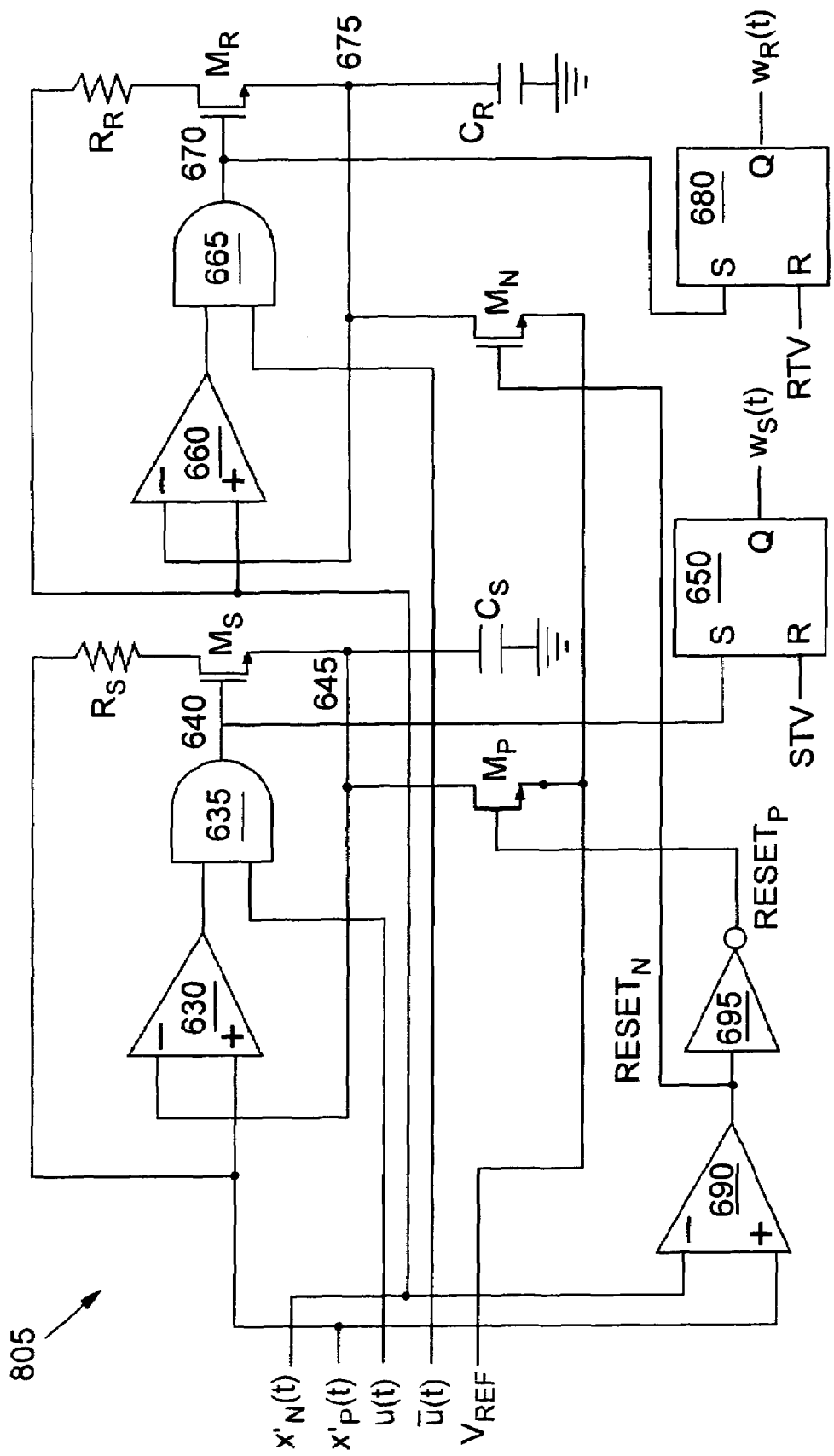
FIG. 8 is a schematic diagram of a dual peak processing circuit in the edge detection system of FIG. 3.

FIG. 8 is a schematic diagram of one circuit 805 implementing both halves (STV and RTV) of the multiple peak processing circuit 320. In the circuit 805, the first derivative signal x'(t) is a differential signal. The two signals making up the differential pair are $x'_P(t)$ and $x'_N(t)$, the positive and negative sides, respectively. The circuit 805 contains two separate circuits, each like the circuit 605, one for each signal of the differential pair. The first circuit, which processes $x'_P(t)$, comprises the comparator 630, AND gate 635, transistor $M_S$, capacitor $C_S$, resistor $R_S$, set-reset flip-flop 650 and the nodes 640 and 645, just as in the circuit 605. The other circuit, which processes $x'_N(t)$, comprises corresponding elements: comparator 660, AND gate 665, transistor $M_R$, capacitor $C_R$, resistor $R_R$, set-reset flip-flop 680, and nodes 670 and 675, respectively.

In addition, the circuit 805 comprises circuitry to selectively enable and disable the two complementary circuits such that only one operates at any given time. That additional circuitry comprises a comparator 690, an inverter 695, and two transistors $M_P$ and $M_N$. The inputs of the comparator 690 are the differential pair. The output of the comparator 690 is a signal labeled $RESET_N$, which is input to the inverter 695 to produce a signal labeled $RESET_P$. The signal $RESET_N$ is high and the signal $RESET_P$ is low during a positive half cycle of x'(t), when $x'_P(t)>x'_N(t)$. During that time, the signal $RESET_N$, which is connected to the gate of the transistor $M_N$, causes the transistor $M_N$ to turn on and thereby to discharge the capacitor $C_R$ to a DC reference voltage $V_{REF}$, which is the reference voltage for the differential pair $x'_P(t)$ and $x'_N(t)$, where $x'_P(t)-V_{REF}=V_{REF}-x'_N(t)$. Also, during that time, the signal $RESET_P$, which is connected to the gate of the transistor $M_P$, causes the transistor $M_P$ to turn off, thus allowing the capacitor $C_S$ to charge in response to $x'_P(t)$ and the first circuit to operate normally. Conversely, during a negative half cycle of x'(t), when $x'_N(t)>x'_P(t)$, the transistor $M_P$ turns on, discharging the capacitor $C_S$, while the transistor $M_N$ turns off, allowing the second circuit to operate normally. The reference voltage $V_{REF}$ can be seen in FIG. 7B at a level slightly below 1.54 volts.

The circuit 805 can be built using discrete components or as an integrated circuit (IC) alone or in combination with circuitry for other parts of an optical code reader. One advantage of the circuit 805 in IC form is that it requires relatively little die area. While the circuit 805 has been illustrated with FET transistors, they may be of any type.

Moreover, the circuit 805 can be implemented digitally rather than in analog form. One way to do so is to convert the scan line signal x(t) to a digital form (with suitable pre-amplification and anti-alias filtering) and feed the digitized signal to a special-purpose digital logic circuit (e.g., a digital application specific integrated circuit (ASIC) or programmable logic array) or a processor (e.g., a general-purpose microprocessor or digital signal processor (DSP)), which is programmed to implement the steps 420–450 of the method 400. Although the analog form of the circuit 805 is preferred at the present time because of its lower cost and power consumption, those factors may change in the future.

Figure 9:
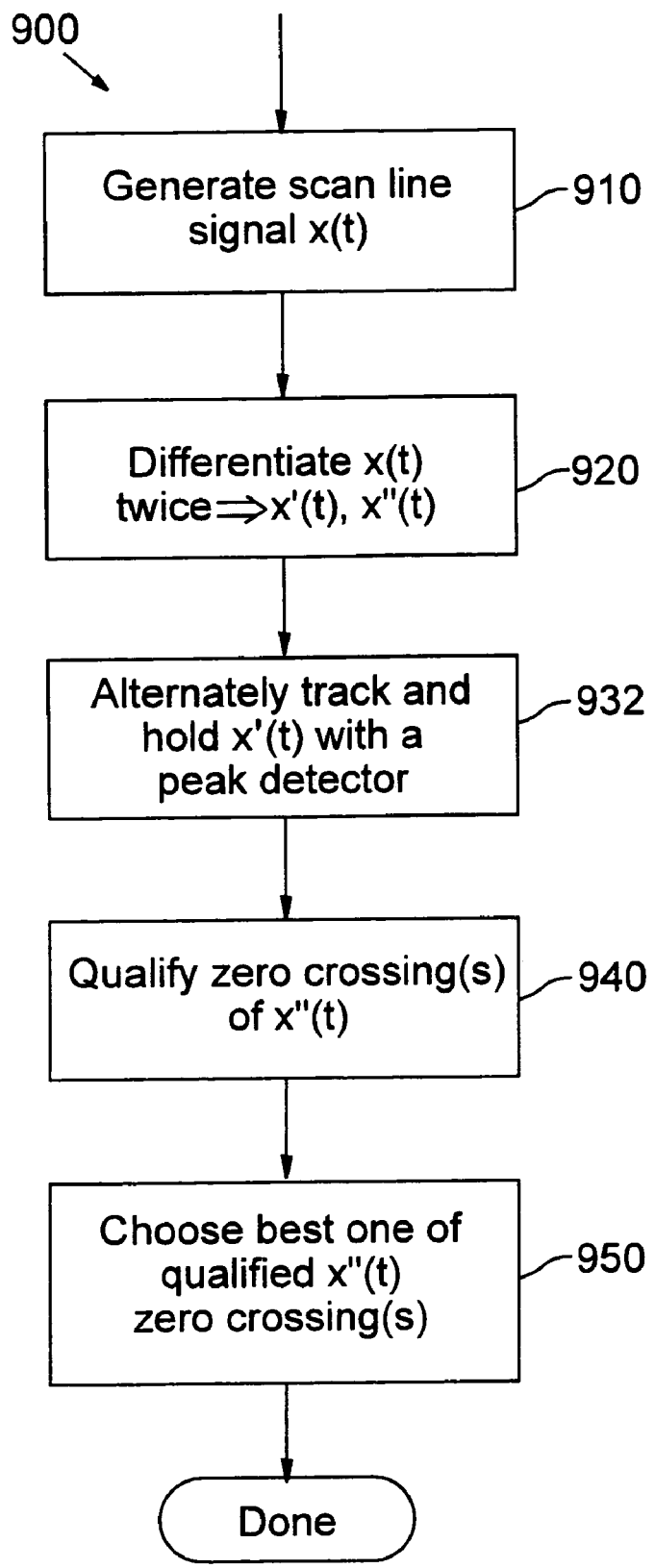
FIG. 9 is a flowchart of a method according to one embodiment.

More generally, the method 400 and similar methods can be implemented in special-purpose digital hardware or programmed for execution on a processor. An alternative method 900, which is also suitable for digital implementation, is illustrated in FIG. 9. The method 900 begins by generating (step 910) a scan line signal x(t) and differentiating (step 920) it twice to yield x'(t) and x"(t). Next, the method 900 alternately tracks and holds (step 932) x'(t) with a peak detector, such as the peak detector 638, as x'(t) varies over time. Tracking preferably involves tracking the x'(t) signal while it is not less than a previous one of the multiple like-polarity successive local peaks in a half cycle, while holding preferably involves holding a value approximately equal to a peak that is greater than any previous one of the multiple like-polarity successive local peaks in the first derivative, until a larger magnitude peak in the series of multiple like-polarity successive local peaks is encountered. Indeed, steps are preferably taken to insure that the stored value is as close as possible to the voltage of the associated peak. For example, the circuit 605 connects the drain terminal of the transistor $M_S$ to x'(t) rather than a positive supply to accomplish that goal. Moreover, the method 900 preferably expedites the transitions from tracking to holding to improve response time, which in turn reduces the error of the stored value. For example, the circuit 605 utilizes u(t) via the AND gate 635 to accomplish that goal.

Because it is the zero crossings of x"(t) that indicate, albeit possibly ambiguously, locations of edges in the binary optical code that the scan line signal x(t) represents (albeit imperfectly), the method 900 performs a qualifying step 940 to qualify certain of the zero crossings of x"(t). In particular, peaks picked up by the peak detector as it processes x'(t) are qualified. Finally, the method 900 chooses (step 950) the most likely one of the qualified zero crossings of x"(t). As explained above, the most likely qualified zero crossing is the largest one, which is the one occurring last in time in a half cycle of x'(t). Note that the steps of the method 900 can be performed in an order different from that illustrated, or in some cases simultaneously; FIG. 9 is presented in a simplified, linear order of steps to most readily teach the concepts involved, not to imply a particular order of operations.

The methods and systems illustrated and described herein can exist in a variety of forms both active and inactive. For example, they can exist as one or more software programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. A system for processing a signal imperfectly indicating perceived regions of relatively light and dark areas arranged in an alternating pattern as part of a binary optical code, the system comprising:
   a differentiator that generates a first derivative of the signal;
   a first comparator, connected to the differentiator, that compares the first derivative to a first threshold, the first comparator producing an output when the first derivative exceeds the first threshold;
   a second comparator, connected to the differentiator, that compares the first derivative to a second threshold, the second comparator producing an output when the first derivative is less than the second threshold; and
   a circuit receiving as an input the first derivative, the first derivative having a magnitude measured with respect to a reference level, the first derivative undergoing half-cycles of alternating polarity between successive crossings of the reference level, the first derivative having within a half-cycle a series of one or more successive local peaks of the same polarity as the half-cycle in which they occur, the circuit comprising:
      a first peak detector having an input receiving the first derivative, the first peak detector being operative during a positive half-cycle either to produce an output that approximately tracks the first derivative signal while both (a) the first derivative is sloping in the positive direction and (b) the first derivative is greater than at any previous time during the positive half-cycle or to produce an output that approximately holds near local positive peaks having increasingly larger magnitude in the positive half-cycle;
      a first node in the first peak detector having a voltage indicative of whether the first peak detector is in a tracking state or a holding state;
      a first set-reset flip-flop having a set input connected to the first node;
      a second peak detector having an input receiving the first derivative, the second peak detector being operative during a negative half-cycle either to produce an output that approximately tracks the first derivative signal while both (a) the first derivative is sloping in the negative direction and (b) the first derivative is less than at any previous time during the negative half-cycle or to produce an output that approximately holds near local negative peaks having decreasingly smaller value in the negative half-cycle;
      a second node in the second peak detector having a voltage indicative of whether the second peak detector is in a tracking state or a holding state; and
      a second set-reset flip-flop having a set input connected to the second node.

2. A circuit for detecting edges in a binary optical code, the circuit comprising:
   means for receiving a signal imperfectly indicating perceived regions of relatively dark and relatively light areas arranged in an alternating pattern as part of a binary optical code;
   means for differentiating the signal to form a first derivative of the signal, wherein the first derivative may have a series of successive local peaks of the same polarity;
   means for ignoring peaks in the series having a peak value less than any previous peak value in the series, thereby resulting in a set of unignored peaks;
   means for choosing from the unignored peaks in the series the one peak occurring last in order; and
   means for generating, according to the chosen peak, a signal indicative of an edge between a light area and a dark area in the pattern.

3. A method to aid in choosing a single peak among a series of multiple like-polarity successive local peaks in a first derivative of a scan line signal derived by scanning or imaging a binary optical code, the method comprising:
   tracking the first derivative while said first derivative is not less than a previous one of the multiple like-polarity successive local peaks in the first derivative;
   holding a value approximately equal to a peak that is greater than any previous one of the multiple like-polarity successive local peaks in the first derivative, until a larger magnitude peak in the series of multiple like-polarity successive local peaks is encountered;
   switching between the tracking step and the holding step as the first derivative varies over time; and
   based on occurrences of the tracking and holding steps, disregarding those peaks in the series having a peak value less than any previous peak in the series.

4. A method according to claim 3, wherein the tracking and holding steps comprise:
   comparing a stored value of the first derivative to a present value of the first derivative; and selectively either adjusting the stored value to match the present value of the first derivative when the present value exceeds the stored value, or holding the stored value when the stored value exceeds the present value of the first derivative.

5. A method according to claim 4, further comprising:
holding the stored value if the first derivative is near a local peak.

6. A method according to claim 4, further comprising:
limiting magnitude of growth of the stored value after a peak has occurred.

7. A method according to claim 4, further comprising:
expediting transitions from the tracking step to the holding step.

8. A method according to claim 4, further comprising:
choosing from among the peaks not disregarded the one peak occurring last in time.

9. A method according to claim 4, further comprising:
generating the scan line signal.

10. A method according to claim 9, wherein the generating step comprises optically sensing a binary optical code.

11. A method according to claim 4, further comprising:
differentiating the scan line signal to generate the first derivative.

12. A method according to claim 4, further comprising:
differentiating the first derivative to generate a second derivative; and
comparing the second derivative to a reference level to determine reference level crossings of the second derivative; and
qualifying reference level crossings of the second derivative using peaks of the first derivative not disregarded by the disregarding step.

13. A circuit for processing an input signal derived from a binary optical code, the magnitude of the input signal being measured with respect to a reference level, the input signal undergoing a half-cycle between successive crossings of the reference level, during a half-cycle the input signal having a series of multiple successive local peaks of the same polarity as the half-cycle in which they occur, the circuit comprising:
a peak detector having an input receiving the input signal, the peak detector approximately tracking the input signal while the absolute value of the input signal is both (a) increasing and (b) greater than at any previous time during the half-cycle, the peak detector otherwise approximately holding during the half-cycle near those local peaks having increasingly larger magnitudes in the series of multiple successive peaks of the same polarity as the half-cycle;
a node in the peak detector having a voltage indicative of whether the peak detector is in a tracking state or a holding state; and
a set-reset flip-flop having a set input connected to the node, whereby the output of the flip-flop is set when the peak detector is in a tracking state.

14. A circuit according to claim 13, wherein the peak detector comprises a comparator having two inputs and an output, a switch having a control terminal and two controllable conduction terminals, a capacitor, and a resistor; wherein the input signal is connected to a first of the comparator inputs, the comparator output is connected to the switch control terminal, the resistor is connected between one of the conduction terminals of the switch and the input signal, the capacitor is connected to the other of the conduction terminals of the switch, and the voltage across the capacitor is input to the second of the comparator inputs.

15. A circuit according to claim 14, wherein the switch comprises a transistor.

16. A circuit according to claim 15, wherein the transistor is an FET transistor, the control terminal is a gate terminal, and the controllable conduction terminals are drain and source terminals.

17. A circuit according to claim 14, further comprising:
an AND gate connected between the comparator and the switch, wherein the AND gate has an input connected to the comparator output, an output connected to the control terminal of the switch, and an input receiving a signal indicating that the absolute value of the input signal relative to the reference level is increasing.

18. A circuit according to claim 13, wherein the input signal is a first derivative of a signal imperfectly indicating perceived regions of relatively light and dark areas arranged in an alternating pattern as part of a binary optical code.

19. A circuit according to claim 18, wherein the optical code is a bar code, the relatively light areas are spaces in the bar code, and the relatively dark areas are bars in the bar code.

20. The circuit according to claim 13, wherein the flip-flop has a reset input receiving a signal indicating detection of an edge of a feature in a binary optical code.

* * * * *